United States Patent
Wagner-Krankel et al.

(10) Patent No.: US 8,620,815 B1
(45) Date of Patent: Dec. 31, 2013

(54) SYSTEMS AND METHODS FOR DOCUMENT MANAGEMENT

(75) Inventors: Dale Alan Wagner-Krankel, San Antonio, TX (US); Wayne Maurice Hartman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1230 days.

(21) Appl. No.: 12/488,023

(22) Filed: Jun. 19, 2009

(51) Int. Cl.
*G06F 21/00* (2013.01)
*G06F 7/00* (2006.01)

(52) U.S. Cl.
USPC .............................. 705/50; 707/803; 726/27

(58) Field of Classification Search
USPC ......................................................... 705/50
See application file for complete search history.

(56) References Cited

U.S. PATENT DOCUMENTS

| | | | |
|---|---|---|---|
| 2005/0076066 A1 | 4/2005 | Stakutis et al. | |
| 2005/0223414 A1* | 10/2005 | Kenrich et al. | 726/27 |
| 2006/0190495 A1 | 8/2006 | Lundberg et al. | |
| 2007/0174629 A1 | 7/2007 | Suominen | |
| 2007/0276878 A1* | 11/2007 | Zheng et al. | 707/202 |
| 2008/0002830 A1 | 1/2008 | Cherkasov et al. | |
| 2008/0005204 A1* | 1/2008 | Prus et al. | 707/205 |
| 2008/0107271 A1 | 5/2008 | Mergen | |
| 2010/0306175 A1* | 12/2010 | Johnson et al. | 707/663 |
| 2010/0306283 A1* | 12/2010 | Johnson et al. | 707/803 |
| 2012/0246126 A1* | 9/2012 | Rodriguez et al. | 707/692 |

OTHER PUBLICATIONS

Ateniese, Giuseppe et al.: "Improved Proxy Re-Encryption Schemes with Applications to Secure Distributed Storage", pp. 1-25.

* cited by examiner

*Primary Examiner* — Charles C Agwumezie
(74) *Attorney, Agent, or Firm* — Brooks, Cameron & Huebsch, PLLC

(57) ABSTRACT

A user retains access to a document previously generated or received by an institution system and stored in encrypted form in storage of the institution system or another entity associated with the institution system. However, the institution system does not have access to the document (in readable form) after an expiration of an amount of time. The document is encrypted in such a manner that only the user can decrypt the document, but the institution system cannot decrypt it. In this manner, the institution system may meet business or regulatory requirements or policies directed to discarding (i.e., purging) the document after a predetermined amount of time, but can still provide secure storage of the document in encrypted form to the user independent of the business or regulatory requirements or policies that mandate purging the document.

7 Claims, 6 Drawing Sheets

SYSTEMS AND METHODS FOR DOCUMENT MANAGEMENT

BACKGROUND

A business often generates or receives documents for customers of the business. For example, a financial services institution often generates or receives loan documents, deposit account statements, investment account statements, insurance policies, home inventories, digital image files, video data files, etc. for its customers.

Typically, the business electronically stores a document in storage for an amount of time and then discards the document. After the amount of time expires, the business may discard the document from its storage for a number of reasons, such as to comply with a document retention (or destruction) policy, because of local, state, and/or federal regulations, or to save or recapture storage space. A customer may request access to the document from the business after the amount of time has expired. Because the amount of time has expired, however, the business has discarded the document and the document is unavailable to the customer.

SUMMARY

A user retains access to a document previously generated or received by an institution system and stored in encrypted form in storage of the institution system or another entity associated with the institution system. However, the institution system does not have access to the document (in readable form) after an expiration of an amount of time. The document is encrypted in such a manner that only the user can decrypt the document, but the institution system cannot decrypt it.

In an implementation, the institution system may encrypt the document using a key and may provide the key to the user. The institution system may store the key and may send the encrypted document to an aggregator for storage on behalf of the user. The institution system cannot access the encrypted document that is stored by the aggregator. The aggregator cannot interpret (i.e., read or view) the encrypted document that they are storing on behalf of the user because the aggregator does not have a key used by the institution system to encrypt the document.

In an implementation, the aggregator may use another key to further encrypt the encrypted document received from the institution system. The user may then use two keys to decrypt the document.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
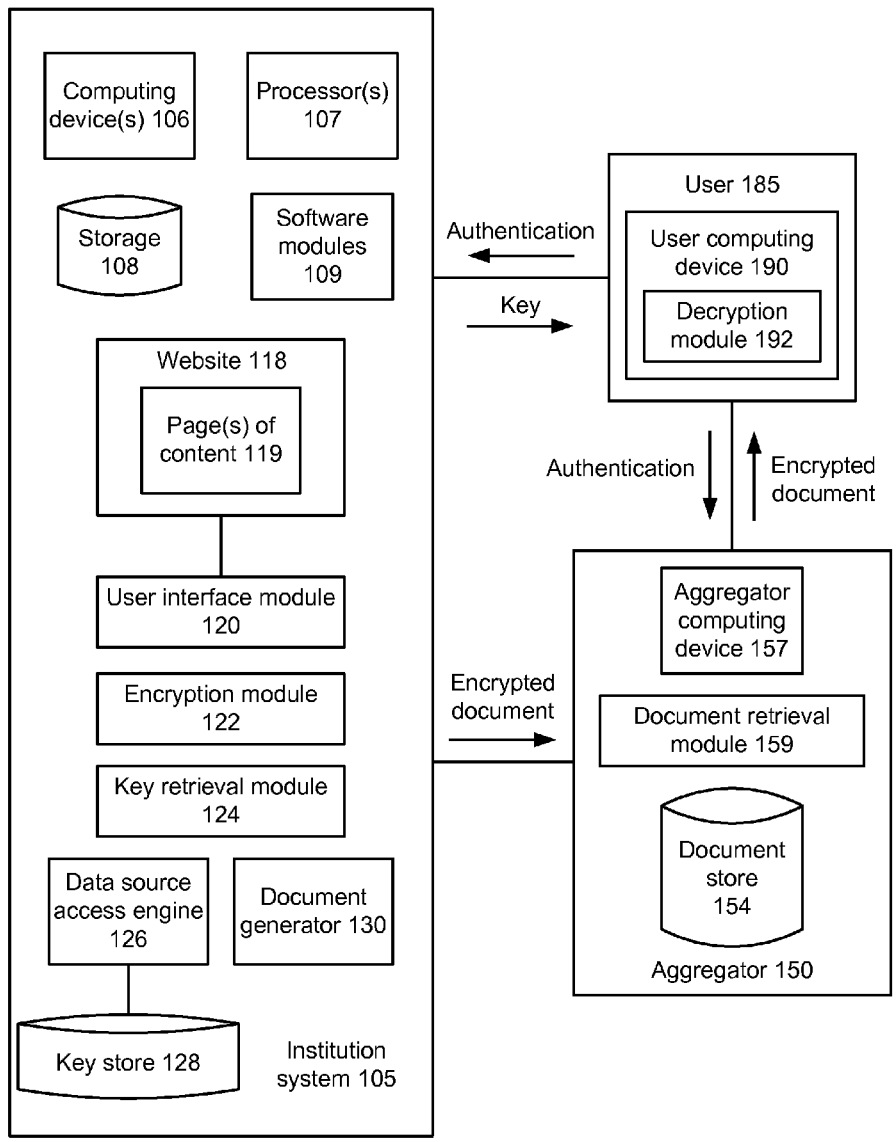
FIG. 1 is a block diagram of an implementation of a system that may be used to provide document management.

FIG. 1 is a block diagram of an implementation of a system that may be used to provide document management. An institution system 105 is shown along with a user 185 and an aggregator 150. As described further herein, the user 185 retains access to a document previously generated or received by the institution system 105 and stored in encrypted form in storage of the institution system 105 or another entity associated with the institution system 105, such as the aggregator 150. It is noted that although the aggregator 150 may be associated with the institution system 105, the aggregator 150 is a separate entity from the institution system 105 (i.e., unaffiliated with the institution system 105).

The institution system 105, or an institution affiliated with or associated with the institution system 105, does not have access to the document (in readable form) after an expiration of an amount of time. The document is encrypted in such a manner that only the user 185 can decrypt the document, but the institution system 105 cannot decrypt it. In this manner, the institution system 105 or an institution affiliated with the institution system 105, may meet business or regulatory requirements or policies directed to discarding (i.e., purging) the document after a predetermined amount of time (e.g., 7 years, 10 years, 15 years, etc.), but can still provide secure storage of the document in encrypted form to the user 185 independent of the business or regulatory requirements or policies that mandate purging the document.

The institution system 105, associated with or otherwise maintained by an institution such as a financial services institution, may generate a document for the user 185 using a document generator 130. The document generator 130 may comprise a computing device, an example of which is described with respect to FIG. 6. Alternatively, the institution system 105 may receive the document from the user 185 or a third party. The document may be received from a user computing device 190 of the user 185 via a communications network. An example user computing device 190 is described with respect to FIG. 6.

Any type of document may be generated or received by the institution system 105 and used with the systems and methods described herein, such as a loan document, a credit card statement, a deposit account statement, an investment account statement, an insurance policy, an email, a home inventory, a digital image file, a video data file, etc. Data generated by the institution system 105 or received from the user 185 or another party might include any type of documents associated with any type of application in any type of format (e.g., text, graphics, multimedia, etc.).

The user computing device 190 and the institution system 105 may be connected over a communications network. The user 185 may communicate with the institution system 105 by way of the communications network such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 185 may also communicate with the institution system 105 by phone, email, instant messaging, text messaging, web chat, facsimile, mail, and the like.

The institution system 105 may encrypt the document using an encryption module 122. Any known encryption technique(s) may be used. In an implementation, the encryption technique uses an encryption key (referred to herein as a key) and an encryption algorithm to encrypt the document, and the institution system 105 may store the key in a key store 128 and provide the key and the encryption algorithm to the user 185. The institution system 105 may maintain the key in the key store 128 even after the document has been purged from the storage 108 of the institution system 105. Thus, the institution system 105 may provide the key and the encryption algorithm to the user 185 even after the document has been purged from the storage 108.

In an implementation, the user 185 may send a request for the key from the user computing device 190 to the institution system 105. The request may be made via a website 118 of the institution system 105 or any other electronic technique such as email, instant message, text message, web chat, facsimile, phone, etc. A key retrieval module 124 of the institution system 105 may retrieve the key from the key store 128 via a data source access engine 126 and provide the key to the user computing device 190 via a communications network.

The institution system 105 sends the encrypted document to an aggregator computing device 157 of the aggregator 150. The aggregator 150 may store the encrypted document for the institution system 105 on behalf of the user 185, e.g., in a database record associated with the user such as an identifier of the user. In an implementation, the aggregator 150 may store the encrypted document in a document store 154. The document store 154 may comprise an online repository that the user 185 may access e.g., via a communications pathway between the user 185 (e.g., the user computing device 190) and the aggregator 150 (e.g., the aggregator computing device 157) via a communications network. The user 185 may request the encrypted document from the aggregator 150. Pursuant to receiving the request, a document retrieval module 159 of the aggregator 150 may obtain the encrypted document from the document store 154 and provide the encrypted document to the user computing device 190. The user computing device 190 may comprise a decryption module 192 that may decrypt the encrypted document using the appropriate key and encryption algorithm, as described further herein.

The institution system 105 cannot access the encrypted document that is stored by the aggregator 150. The aggregator 150 cannot interpret (i.e., read or view) the encrypted document that they are storing on behalf of the user 185 because the aggregator 150 does not have a key used by the institution system 105 to encrypt the document.

In an implementation, the institution system 105 may store the unencrypted document in storage, such as a storage 108, for an amount of time in accordance with a retention policy (also referred to as a destruction policy) or other regulation, requirement, or procedure. After the amount of time elapses (e.g., an expiration date passes), the document may be discarded (also referred to as purged) from the storage 108. The document, in encrypted form, may be maintained by the aggregator 150 for the user 185 to access at any time, even after the institution system 105 has discarded the unencrypted document from the storage 108.

In such an implementation, the institution system 105 holds the key and the aggregator 150 maintains the encrypted document. Neither the institution system 105 nor the aggregator 150 can produce a readable or otherwise viewable (i.e., unencrypted) document on their own, and thus they are unable to supply an unencrypted document in response to a request (after the unencrypted document has been purged from the storage 108 of the institution system 105). The user 185 may read or view the document without maintaining their own archived copy on the user computing device 190 or any other computing device of the user 185.

The institution system 105 may include a user interface module 120. The user interface module 120 may generate and format one or more pages of content 119 as a unified graphical presentation that may be provided to the user computing device 190 as an output, e.g., from the key retrieval module 124 or the document generator 130 in an implementation. The page(s) of content 119 may be provided to the user computing device 190 via the website 118 associated with the institution system 105.

The user 185 may interface with the institution system 105 via the website 118 that may display one or more pages of content 119 to the user 185 on the user computing device 190. A request for a document or a key may be received at the institution system 105 from the user computing device 190 through any suitable means, such as interaction with a web browser that is in communication with the institution system 105. The actual mechanism of connection is outside the scope of the present discussion.

In an implementation, instead of hosting the website 118, the institution system 105 may comprise a conventional application server hosting a proprietary online service accessible only by a private network. In any event, the institution system 105 may have appropriate security mechanisms in place to prevent unauthorized third parties from intercepting the user's information.

The institution system 105 has access to data pertaining to the user 185, including unencrypted documents that are currently stored by the institution system 105, such as in the storage 108, and keys and algorithms that have been used to encrypt documents and that are stored in the key store 128, for example. The institution system may retrieve the data from the storage 108 and the key store 128 or other associated storage via the data source access engine 126.

A user access system may be communicatively coupled to the institution system 105 and may be configured to send machine-readable instructions to the institution system 105. Those instructions may cause the institution system 105 to access the storage 108 and/or the key store 128, for example. A unified graphical presentation may be transmitted to the user access system.

The user access system may be implemented as a web server in an implementation. The user access system, through the use of any suitable interactive web technology, provides an interactive experience to the user 185 through which access to and maintenance of their documents and keys with associated algorithms can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The user computing device 190 may allow a user 185 to interact with the computing device(s) 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein.

Examples of software modules 109 may include modules for identifying and authenticating a user, generating a document, encrypting a document with a key, providing the encrypted document to the aggregator 150, providing the key and encryption algorithm to the user 185, storing the document and the key, receiving a request for the document, providing the request for the document to the aggregator, generating web page content for display, and receiving instructions from the user 185, described further herein. While specific functionality is described herein as occurring with respect to specific modules, the functionality may likewise be performed by more, fewer, or other modules.

Figure 2:
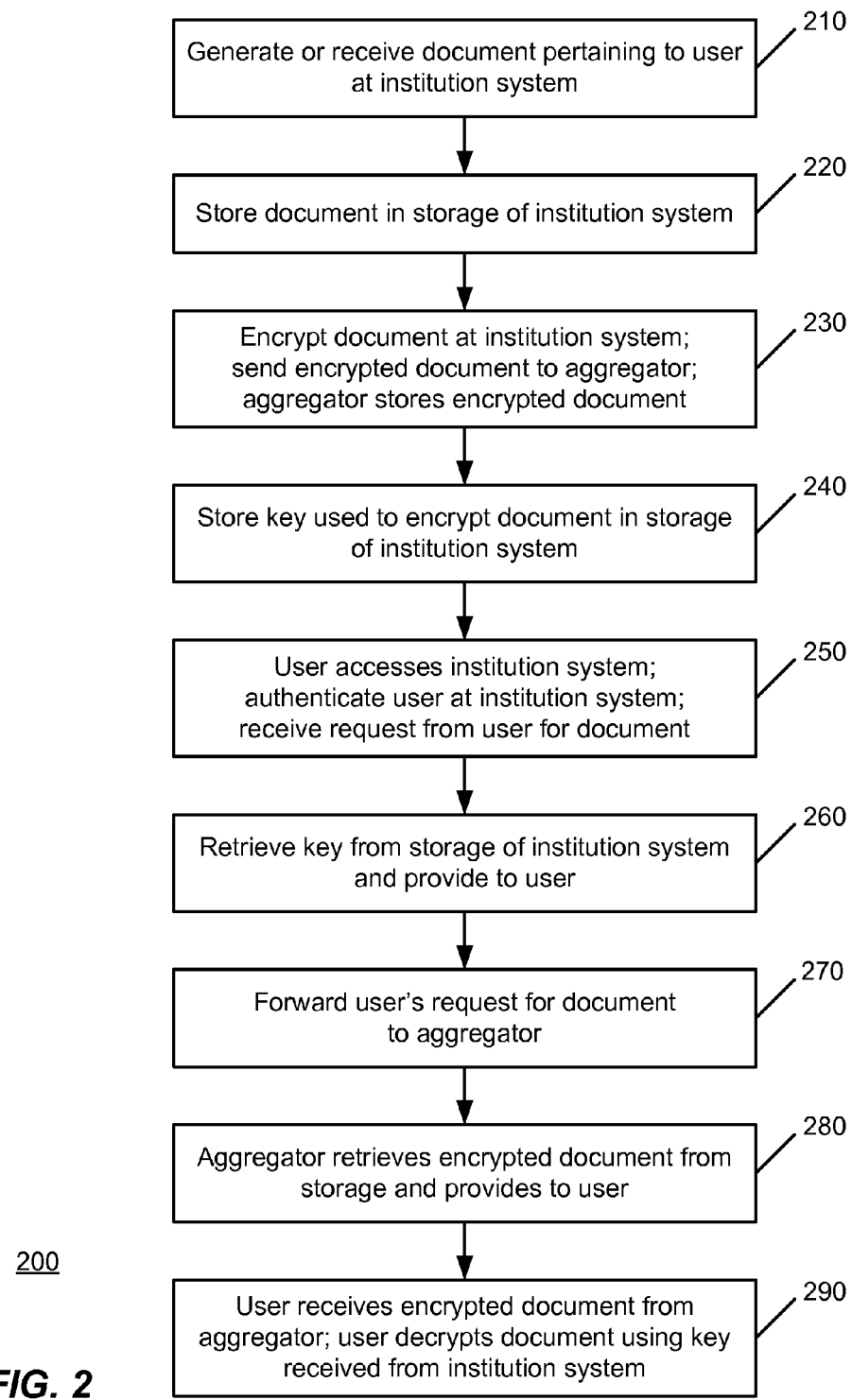
FIG. 2 is an operational flow of an implementation of a method that may be used to provide document management.

FIG. 2 is an operational flow of an implementation of a method 200 that may be used to provide document management. At 210, a document pertaining to a user, such as the user 185, is generated (e.g., by the document generator 130) or received by the institution system 105 (e.g., from the user computing device 190 or a third party). Further to the description above with respect to FIG. 1, any type of document may be generated or received, such as an email, a message, information related to a transaction, a facsimile, a photo, or any type of data, for example.

At 220, the document may be stored in storage of the institution system 105, such as the storage 108. The document may be stored in accordance with a retention policy of the institution system 105 such that the document (unencrypted) may be purged from the storage 108 at a predetermined time (e.g., at the expiration of an amount of time).

At 230, the document may be encrypted by the institution system 105, such as by the encryption module 122. Any encryption method may be used, such as AES (advanced encryption standard) or a similar symmetric cipher. The encrypted document may be sent to the aggregator 150, e.g., via a communications network. Such encryption and transmission may be performed pursuant to requesting and receiving authorization from the user 185 regarding the encryption of the document and transmission of the encrypted document to the aggregator 150 for storage. The aggregator 150 may store the encrypted document in storage, such as the document store 154. At 240, the key that was used to encrypt the document may be stored by the institution system 105, e.g., in storage associated with the institution system 105, such as the key store 128.

At 250, at some point such as after the unencrypted document has been purged from the storage 108 of the institution system 105, the user 185 may access the institution system 105 (e.g., via the website 118 or any other electronic technique), be authenticated by the institution system 105, and may request the document. Any authentication technique(s) may be used to authenticate the user 185 to the institution system 105.

In an implementation, the user 185 may access an account of theirs that is maintained by the institution system 105. The user 185 may access the account via the user computing device 190. In an implementation, the user 185 may log on to a website 118 maintained by the institution system 105 using known identification and authentication techniques. After the user logs on to the website 118, the institution system 105 may display a listing of the user's documents maintained by the institution system 105 (e.g., in encrypted form at the aggregator 150) affiliated with the user's account and the user 185 may select one of the documents for retrieval and viewing.

It is contemplated that the user 185 may access an account of theirs via other techniques, such as by accessing an electronic file that is sent to the user 185 by email or that is linked to in an email provided to the user 185. Alternatively, the institution system 105 may provide a private network and/or connection to the user 185 so that the user 185 may access their account via the institution system's private network and/or connection. A user 185 may select an account by highlighting the account identifier (e.g., name, number, etc.), clicking on the account identifier, using pull-down menus, or using any other known selection technique(s).

The user 185 may view a listing of the documents in the account. The document listing may comprise documents internal and/or external to the institution system 105 (e.g., held by the aggregator 150). The listing may be displayed to the user on the user computing device 190. In an implementation, the user 185 may select one of the documents, e.g., by highlighting the document, clicking on the document, using pull-down menus, or using any other known selection technique(s).

At 260, pursuant to receiving the request for the document, the key retrieval module 124 of the institution system 105 may retrieve the key from the key store 128 via the data source access engine 126 and electronically provide the key to the user computing device 190 (e.g., via the website, an email, a link, an instant message, a text message, a web chat, etc.). In an implementation, the institution system 105 may provide the key to the user 185 (e.g., the user computing device 190) prior to receiving any request for the document, such as after encrypting the document with the key at 230 or storing the key in the key store 128 at 240.

At 270, the request for the document may be forwarded from the institution system 105 to the aggregator computing device 157 of the aggregator 150 via a communications network. In an implementation, the request may be provided from the institution system 105 to the aggregator 150 in a transaction that is transparent to the user 185 such that the user 185 does not know that the request is being provided from the institution system 105 to the aggregator 150. At 280, the aggregator 150 may retrieve the encrypted document from the document store 154 using the document retrieval module 159. The aggregator 150 may provide the encrypted document to the user computing device 190.

At 290, the user computing device 190 may receive the encrypted document from the aggregator 150 and may decrypt the document using the decryption module 192 and the key that had been received from the institution system 105. In an implementation, the user computing device 190 uses the key to decrypt the document without user intervention in a transaction that is transparent to the user 185. The user 185 may then view or otherwise access the document.

In an implementation, the user 185 may request the document directly from the aggregator 150 via an access point (e.g., a website, web page, a hyperlink or other link, etc.) provided by the institution system 105 or the aggregator 150.

Figure 3:
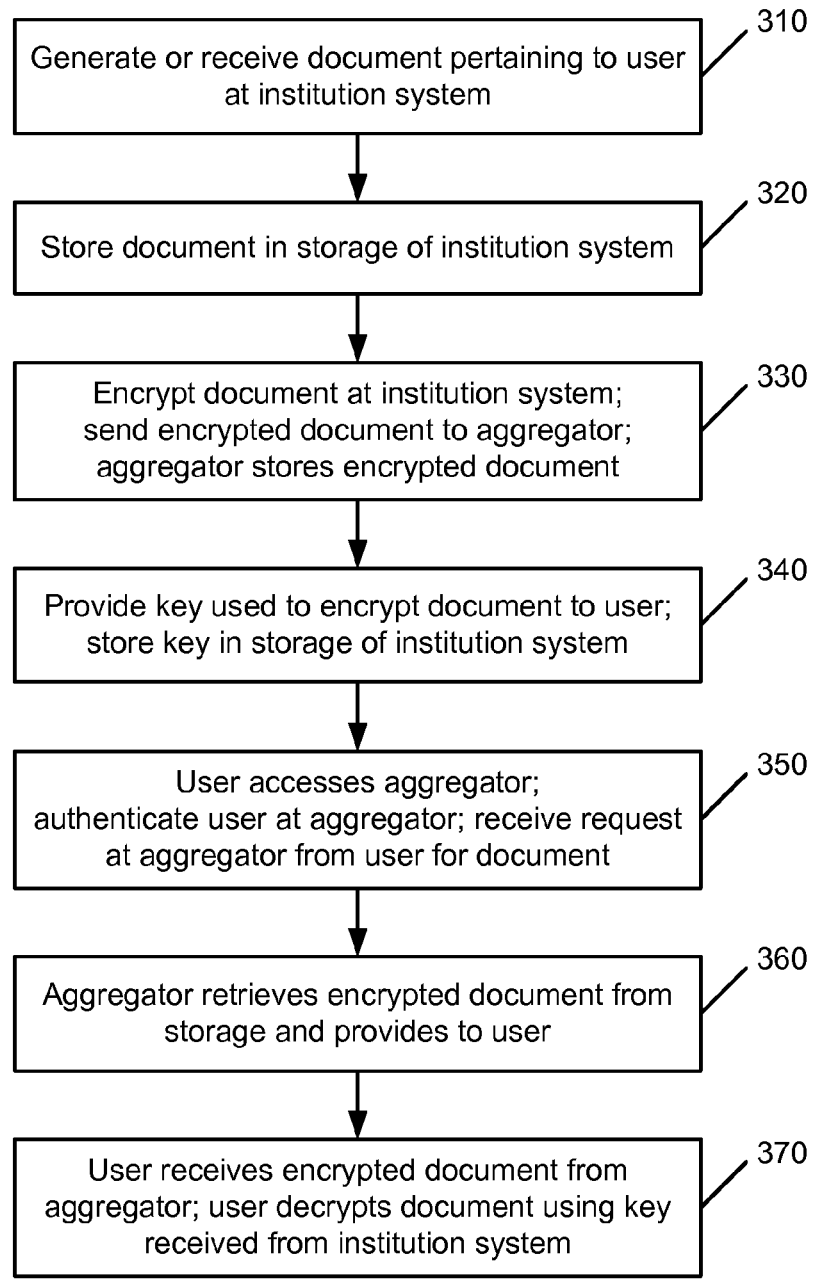
FIG. 3 is an operational flow of another implementation of a method that may be used to provide document management.

FIG. 3 is an operational flow of another implementation of a method 300 that may be used to provide document management. At 310, a document pertaining to the user 185 is generated or received by the institution system 105. At 320, the document may be stored in storage of the institution system 105, and at 330, the document may be encrypted by the institution system 105 using any encryption method. Operations 310, 320, and 330 are similar to operations 210, 220, and 230, respectively, and their further descriptions are omitted for brevity.

At 340, the key and encryption algorithm that was used to encrypt the document may be provided to the user 185 (e.g., to the user computing device 190). The user 185 may store the key and encryption algorithm in storage associated with the user computing device 190. Additionally, in an implementation, the key and encryption algorithm may be stored by the institution system 105, e.g., in storage associated with the institution system 105 such as the key store 128.

At 350, at some point, the user 185 may want to access (e.g., view) the document and may access the aggregator 150 (e.g., via a website of the aggregator 150, a link to the aggregator 150, an email, instant message, text message, web chat, facsimile, phone, or any other electronic technique) or the aggregator computing device 157, may be authenticated by the aggregator 150, and may request the document. Any authentication technique(s) may be used to authenticate the user 185 to the aggregator 150.

At 360, similar to 280, the aggregator 150 may retrieve the encrypted document from the document store 154 using the document retrieval module 159, and may provide the encrypted document to the user 185 by transmitting the encrypted document over a communications network to the user computing device 190.

At 370, similar to 290, the user 185 (e.g., at the user computing device 190) may receive the encrypted document from the aggregator 150 and may decrypt the document using the decryption module 192 and the key that had been received from the institution system 105 in conjunction with the appropriate encryption algorithm. The key may be retrieved from the storage of the user computing device 190, in an implementation. The user 185 may then view or otherwise access the document which has been decrypted.

In an implementation, the institution system 105 may store the encrypted document, e.g., in the storage 108 or other storage associated with the institution system 105, and the aggregator 150 may receive and store the key used by the institution system 105 to encrypt the document. When the user 185 wants to access the document, the user 185 may request and receive the key from the aggregator 150 and may request and receive the encrypted document from the institution system 105. The user 185 may then decrypt the encrypted document using the key received from the aggregator 150.

Figure 4:
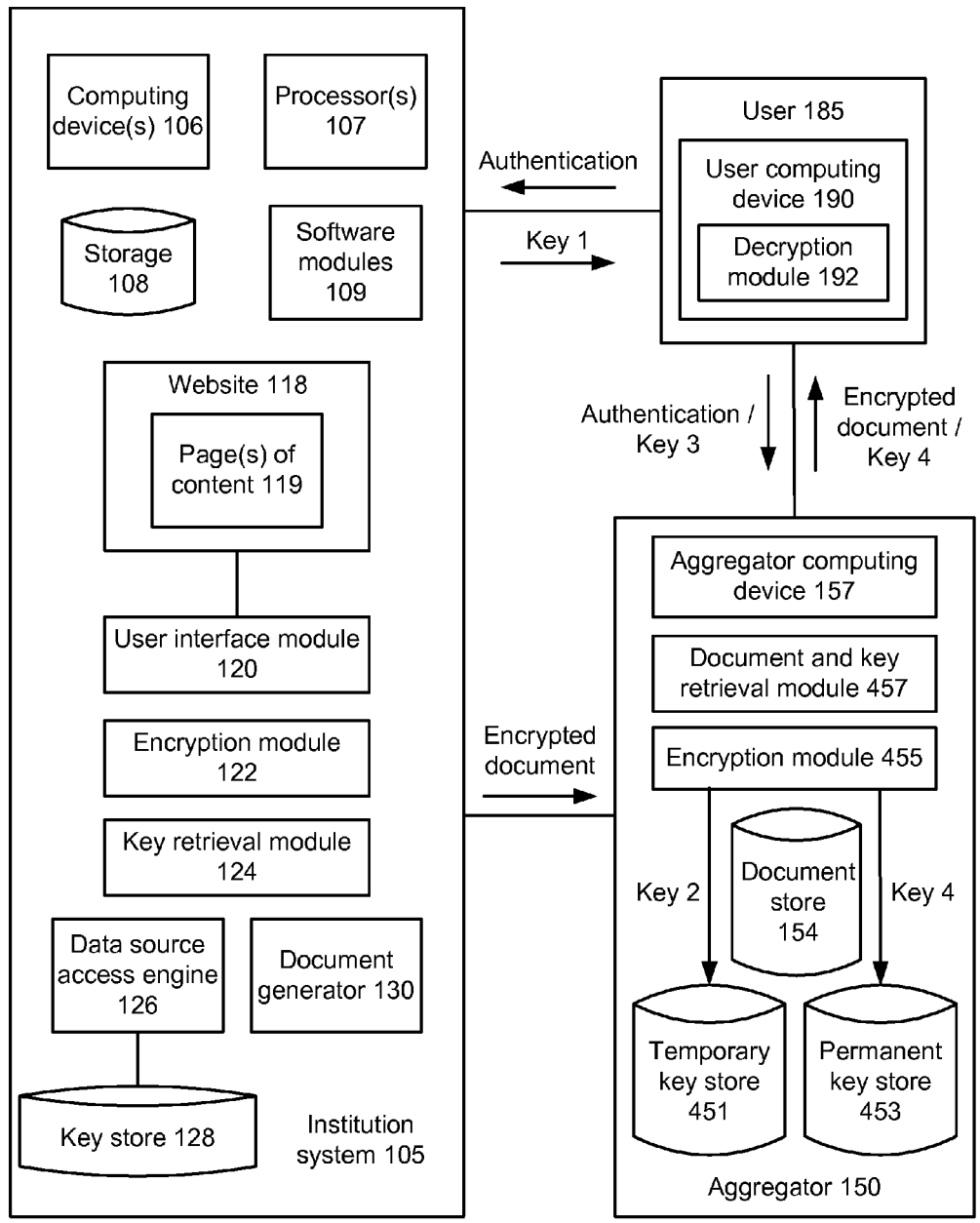
FIG. 4 is a block diagram of another implementation of a system that may be used to provide document management.

FIG. 4 is a block diagram of another implementation of a system that may be used to provide document management. FIG. 4 contains elements that are similar to those described with respect to FIG. 1. Such elements are labeled identically and their descriptions may be omitted for brevity.

The aggregator 150 may comprise an encryption module 455 that may encrypt the encrypted document received from the institution system. In this manner, the document encrypted by the institution system 105 (e.g., with a first key, referred to as Key 1) is encrypted a second time by the aggregator 150 with a second key, referred to as Key 2.

The key (Key 2) used by the encryption module 455 to encrypt the encrypted document may be stored in a temporary key store 451, awaiting a login to the aggregator 150 from the user 185. In an implementation, the temporary key store 451 may be purged if the user 185 does not log in (i.e., fails to log in) within a predetermined time. The predetermined time may be based on a retention time that the institution system 105 has for the document. For example, if the user 185 does not log in to the aggregator 150 before the retention time expires, then the temporary key store 451 may be purged.

When the user 185 logs in to the aggregator 150, data (referred to as Key 3) pertaining to the user and/or the log in, such as the password, may be used to create another key, referred to as Key 4. Key 4 may be stored by the aggregator 150 in a permanent key store 453 and Key 2 may be purged from the temporary key store 451. Key 3 is not retained or stored by the aggregator 150, and thus the aggregator 150 will be unable to decrypt the encrypted document because the aggregator no longer has Key 2 or Key 3.

Figure 5:
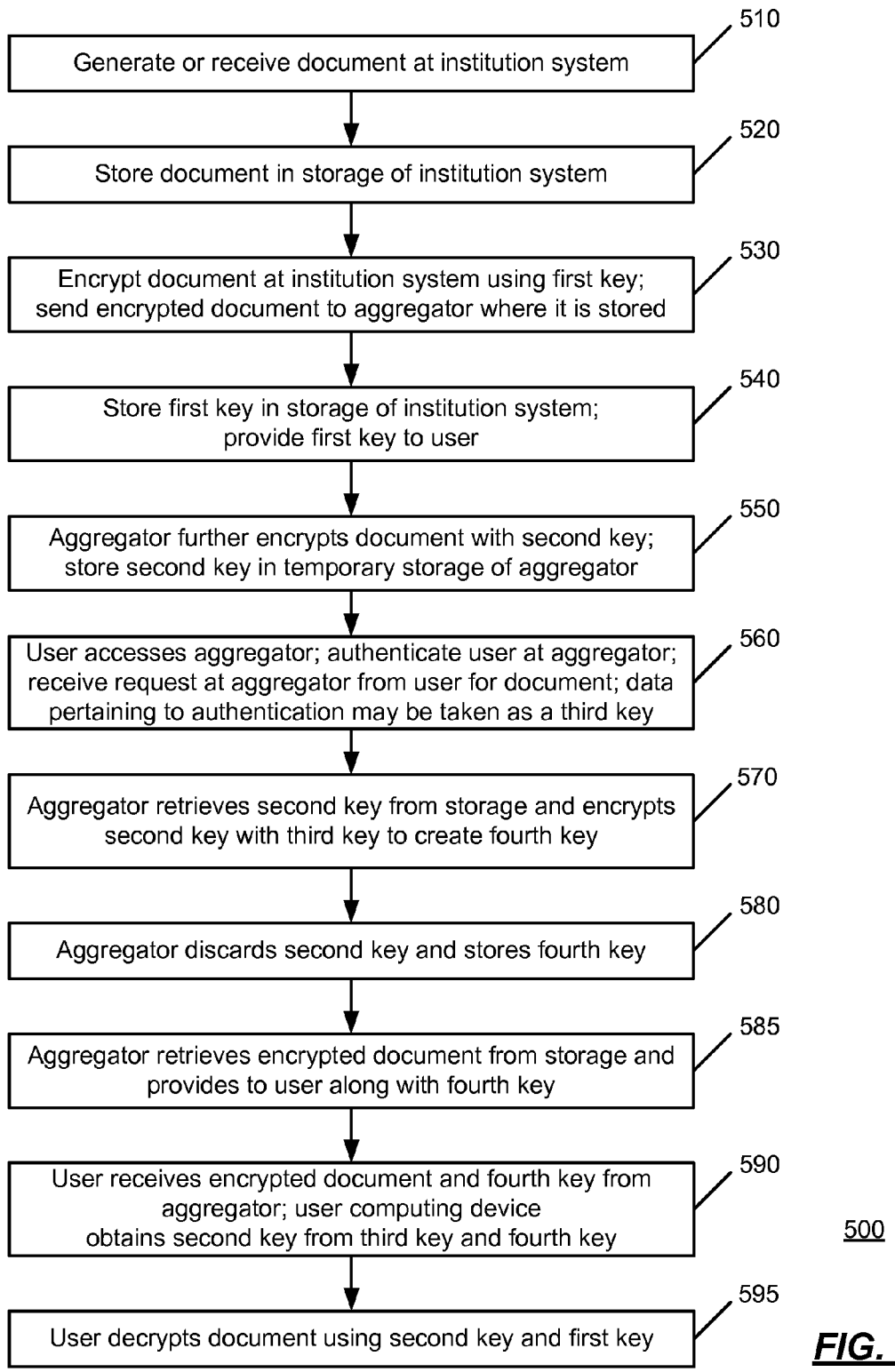
FIG. 5 is an operational flow of another implementation of a method that may be used to provide document management.

As further described with respect to the method 500 of FIG. 5, when the user 185 wants to access the document, the user 185 obtains the encrypted document from the aggregator along with Key 4 via a document and key retrieval module 457. The user 185 may decrypt Key 4 using Key 3 (known to the user 185) to obtain Key 2. The encrypted document may be decrypted using Key 2 and Key 1 (Key 1 having been obtained from the institution system 105). In such an implementation, only the user 185 may produce a readable version of the document.

FIG. 5 is an operational flow of another implementation of a method 500 that may be used to provide document management. At 510, a document pertaining to the user 185 is generated or received by the institution system 105. At 520, the document may be stored in storage of the institution system 105. Operations 510 and 520 are similar to operations 210 and 220, respectively, and their further descriptions are omitted for brevity.

At 530, the document may be encrypted by the institution system 105 using a first key (Key 1) and the encrypted document is sent to an aggregator computing device 157 via a communications network. The encryption of the document and transmission of the encrypted document to the aggregator 150 may be performed by the institution system 105 (e.g., a computing device of the institution system 105) pursuant to receiving authorization from the user 185 regarding such encryption and transmission.

At 540, Key 1 that was used to encrypt the document may be provided to the user 185 (e.g., to the user computing device 190). The user 185 may store the key in storage associated with the user computing device 190. Additionally, in an implementation, Key 1 may be stored by the institution system 105, e.g., in storage associated with the institution system 105 such as the key store 128.

At 550, the encrypted document (that had been encrypted with the first key (Key 1)) may be further encrypted with a second key (Key 2) by the aggregator 150. The second key may be stored in storage (e.g., a temporary key store 451) of the aggregator 150.

At 560, at some point, the user 185 may want to access (e.g., view) the document and may access the aggregator 150 (e.g., via a website of the aggregator 150 or any other electronic technique) or the aggregator computing device 157, may be authenticated by the aggregator 150, and may request the document. Any authentication technique(s) may be used to authenticate the user 185 to the aggregator 150.

Data pertaining to the user or the user's authentication (e.g., a password, a passphrase, a personal identification number (PIN), etc.) may be taken as a third key (Key 3). In an implementation, the conversion of the user password, passphrase, or PIN to an encryption key (Key 3) may be based on a known key extender mapping technique, e.g., multiple iterations of a hash or encryption function.

At 570, the aggregator may retrieve the second key (Key 2) from the temporary key store 451 via the document and key retrieval module 457, and may encrypt the second key with the third key to create a fourth key (Key 4). At 580, the aggregator 150 discards the second key, and stores the fourth key in storage (e.g., in a permanent key store 453). The aggregator 150 may associate the fourth key in storage with the user 185, e.g., in a database record.

At 585, the aggregator 150 may retrieve the previously encrypted document (the document that had been encrypted with Key 1 by the institution system 105) from the document store 154 using the document and key retrieval module 457 and may provide the encrypted document to the user 185 along with the fourth key.

At 590, the user 185 via the user computing device 190 may obtain the second key from the fourth key using the third key. The third key is known to the user 185 because it is based on data (e.g., password, PIN, etc.) that the user 185 entered to authenticate to the aggregator 150 at 560.

At 595, the user 185 (e.g., the user computing device 190) may decrypt the document using the decryption module 192 and the first and second keys in conjunction with the appropriate encryption algorithm. As noted above, the first key is provided by the institution system 105 and the second key is obtained by decrypting the fourth key with the third key. The user 185 may then view or otherwise access the document which has been decrypted.

In an implementation, the institution system 105 may act as the aggregator 150. In such an implementation, the institution system 105 may comprise the components of the aggregator 150, such as the document store 154, the temporary key store 451, and the permanent key store 453, along with the encryption module 455 and the document and key retrieval module 457. The institution system 105 may perform the operations of the method 500 that are described above with respect to the aggregator 150. In this manner, the user 185 may only interact with the institution system 105 to obtain and decrypt a document, thereby accessing the document in readable form. In such an implementation, the user's loss of the password or other data associated with Key 2 would render the document unrecoverable and unreadable, as the institution system 105 is unable to render the document in a readable form.

Figure 6:
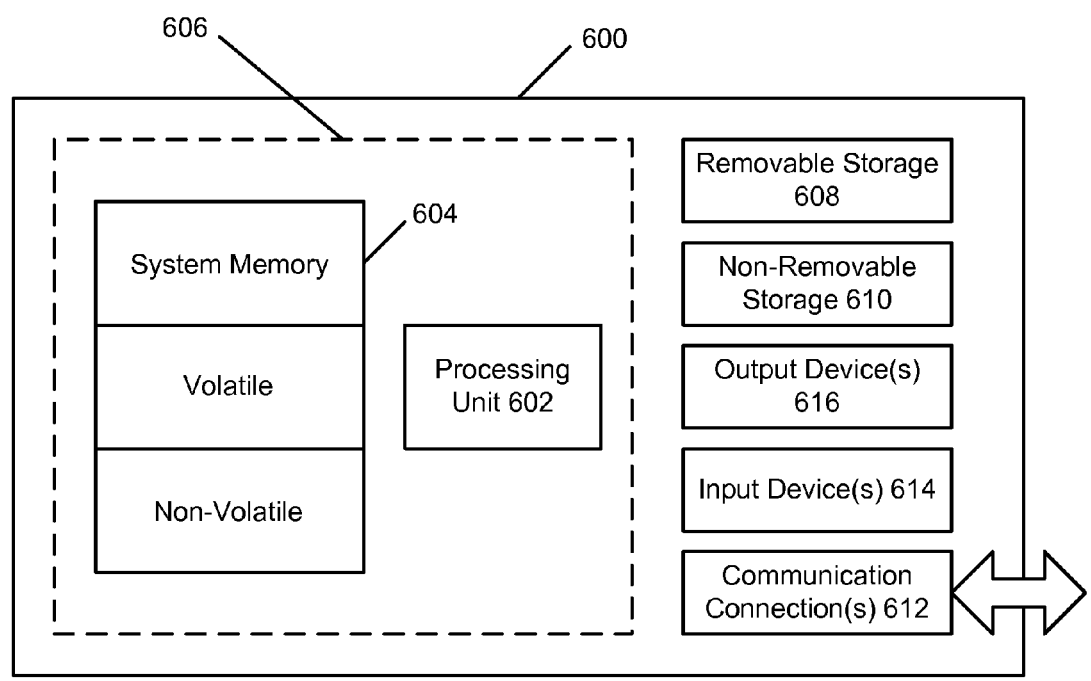
FIG. 6 shows an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A document management system, comprising:
   at least one subsystem that stores a document of a user in storage of an institution system in accordance with a retention policy;
   at least one subsystem that encrypts the document with a key using an encryption module of a computing device of the institution system to generate an encrypted document;
   at least one subsystem that sends the encrypted document from the institution system to a document store of an aggregator, the aggregator being a separate entity from an institution associated with the institution system and storing the encrypted document in the document store beyond when the document is accessible by the institution system based on the retention policy;
   at least one subsystem that forwards a user request to retrieve the encrypted document from the aggregator;
   at least one subsystem that provides the retrieved encrypted document to a user; and
   at least one subsystem that sends the key via a communications network from a key store of the institution system to a user computing device to decrypt the encrypted document from the aggregator after the document is purged from the storage of the institution system based on the retention policy.

2. The system of claim 1, further comprising at least one subsystem that generates the document at the institution system prior to storing the document in the storage of the institution system.

3. The system of claim 1, further comprising at least one subsystem that receives the document at the institution system from the user prior to storing the document in the storage of the institution system.

4. The system of claim 1, further comprising at least one subsystem that maintains the key in the key store of the institution system after the document is purged from the storage of the institution system.

5. The system of claim 1, further comprising:
   at least one subsystem that receives a request for the document from the user when the document is not accessible by the institution system;
   at least one subsystem that retrieves the encrypted document from the document store of the aggregator; and
   at least one subsystem that provides the encrypted document to the user computing device from the aggregator.

6. The system of claim 5, further comprising at least one subsystem that provides the request from the user to the aggregator in a transaction that is transparent to the user.

7. The system of claim 5, further comprising at least one subsystem that authenticates the user before providing the encrypted document to the user computing device from the aggregator.

* * * * *